United States Patent [19]
Umeda et al.

[11] Patent Number: 5,244,934
[45] Date of Patent: Sep. 14, 1993

[54] IRRADIATION OR THERMAL TREATMENT OF WATER-IMPREGNATED CROSS-LINKED POLY-ACRYLIC ACID METAL SALT RESIN PARTICLES

[75] Inventors: Masanari Umeda; Yukio Sakuraba, both of Kasugai; Hiroshi Baba, Yokohama, all of Japan

[73] Assignees: Takai Rubber Industries, Ltd.; Sumitomo Electric Industries, Ltd., Japan

[21] Appl. No.: 801,463

[22] Filed: Dec. 2, 1991

Related U.S. Application Data

[63] Continuation-in-part of Ser. No. 711,887, Jun. 7, 1991, abandoned.

[51] Int. Cl.⁵ ............................ C08J 3/28; C08J 7/12; C08K 3/18; C08L 33/02
[52] U.S. Cl. ............................... 522/129; 522/86; 525/383; 528/499
[58] Field of Search .................. 522/129, 3, 84, 86; 525/383; 528/499

[56] References Cited

U.S. PATENT DOCUMENTS

| | | | |
|---|---|---|---|
| 4,178,221 | 12/1979 | Boutin | 522/84 |
| 4,252,625 | 2/1981 | Boutin | 522/84 |
| 4,376,021 | 3/1983 | Okamoto | 522/86 |
| 4,404,073 | 9/1983 | Bartissol | 522/3 |
| 4,486,489 | 12/1984 | George | 522/84 |
| 4,612,336 | 9/1986 | Yada | 522/3 |
| 4,647,598 | 3/1987 | Yada | 522/3 |
| 5,004,761 | 4/1991 | Yada | 522/84 |

Primary Examiner—Marion E. McCamish
Assistant Examiner—Arthur H. Koeckert
Attorney, Agent, or Firm—Parkhurst, Wendel & Rossi

[57] ABSTRACT

A process of producing a water absorptive resin, wherein a water absorptive polymer which comprises cross-linked poly(metal salt of acrylic acid) as a major component is impregnated with water, and the water-impregnated water absorptive polymer is exposed to one of a high-temperature highly-humid atmosphere or a ultraviolet radiation, to thereby partially release the cross-linkage of the cross-linked poly(metal salt of acrylic acid).

10 Claims, No Drawings

IRRADIATION OR THERMAL TREATMENT OF WATER-IMPREGNATED CROSS-LINKED POLY-ACRYLIC ACID METAL SALT RESIN PARTICLES

This is a continuation-in-part of application Ser. No. 711,887 filed Jun. 7, 1991, now abandoned.

BACKGROUND OF THE INVENTION

1. Field of the Invention

The present invention relates to a process of producing a water absorptive resin.

2. Discussion of the Prior Art

It is well known that a cross-linked water-soluble polymer such as poly(sodium acrylate) or sodium polyacrylate changes from a water-soluble resin to a water-insoluble resin as the cross linking density of the polymer increases. As a typical example of such cross-linked water-soluble polymer, there is known cross-linked sodium polyacrylate which is obtained by copolymerizing a sodium acrylate monomer with a cross-linking agent such as methylenebis (acrylamide). This cross-linked sodium polyacrylate is widely used in various fields, as a water absorptive polymer which has high water absorbing capability.

While the cross-linked sodium polyacrylate has a considerable hygroscopic swelling property, the rate or velocity of water absorption is relatively low, particularly for seawater or saltwater. This low water absorption rate is an obstacle to the practical application of the sodium polyacrylate, for example, as a water cut-off material for an optical fiber cable where the cable is a submarine cable. For this application, therefore, there is a need for improving the rate at which the cross-linked sodium polyacrylate absorbs water, in particular, seawater.

SUMMARY OF THE INVENTION

It is accordingly an object of the present invention to provide a process suitable for producing a water absorptive resin which has an improved rate of water absorption or hygroscopic swelling.

The above object may be accomplished according to the principle of the present invention, which provides a process of producing a water absorptive resin, comprising the steps of preparing a water absorptive polymer which comprises cross-linked poly(metal salt of acrylic acid) as a major component, impregnating the prepared water absorptive polymer with water, and exposing the water-impregnated water absorptive polymer to one of an atmosphere having high humidity and temperature and a ultraviolet radiation, to thereby partially release the cross-linking of the poly(metal salt of acrylic acid).

The present invention was developed based on a finding by the inventors as a result of extensive studies in an effort to improve the rate of water absorption of the cross-linked poly(metal salt of acrylic acid) such as sodium polyacrylate. That is, the inventors found that the cross-linking or cross-linkage of a water absorptive polymer whose major component consists of a cross-linked poly(metal salt of acrylic acid) is partially released or cut at the surfaces of the particles of the water-soluble resin, by first impregnating the water absorptive resin with water and then exposing the water-impregnated water absorptive resin to a high-temperature highly-humid atmosphere, for example an atmosphere within an autoclave. As a result, the molecules which define the particle surfaces of the resin or which exist near the particle surfaces are converted into water-soluble sodium polyacrylate, whereby the water affinity of the water absorptive resin is improved, leading to a considerable increase in the rate of water absorption of the water absorptive resin.

The inventors also found that similar effects are obtained due to partial releasing of the cross-linkage of the water absorptive polymer, by exposing the water-impregnated water absorptive polymer to an ultraviolet radiation.

DETAILED DESCRIPTION OF THE INVENTION

The present invention will be described in greater detail.

While sodium polyacrylate is generally preferably used as the cross-linked poly(metal salt of acrylic acid), the other poly(metal salts of acrylic acid) may be used. In this case, the cross-linking structure in the poly(-sodium metal salts of acrylic acid) is obtained by copolymerizing sodium acrylate, and a cross-linking agent which may be selected from the group consisting of: methylenebis (acrylamide); trimethylolpropane triacrylate; ethylene glycol diacrylate; polyethylene glycol diacrylate; neopentyl glycol diacrylate; and tetramethylolmethane tetraacrylate. However, the cross-linking agent is not limited to the above substances.

There are no particular limitations on the high-temperature highly-humid atmosphere or ultraviolet radiation to which the water absorptive polymer, i.e., cross-linked poly metal salt of acrylic acid) is exposed. However, the atmosphere within an autoclave or the ultraviolet radiation generated by an ultraviolet generator or ultraviolet lamp is generally employed.

In exposing the cross-linked poly(metal salt of acrylic acid) to the high-temperature highly-humid atmosphere or ultraviolet radiation, it is important that the cross-linked poly(metal salt of acrylic acid) is impregnated with a 5–10% by weight of water before it is exposed to the atmosphere or ultraviolet radiation. This water impregnation of the poly(metal salt of acrylic acid) is essential to release or cut the cross-linkage at the surfaces of the particles of the water absorptive resin, by exposure thereof to the atmosphere within an autoclave or other equipment or to the ultraviolet radiation. Generally, a saturated steam having a temperature of about 80°–120° C. is advantageously used as the high-temperature highly-humid atmosphere. The time of exposure to the atmosphere or autoclaving time is generally from about 5 minutes to about 30 minutes. Where the ultraviolet radiation is used, the water absorptive resin is held exposed to the radiation for a period of about 1–5 minutes at 50° C. With the water absorptive resin exposed to the high-temperature highly-humid atmosphere or ultraviolet radiation in the above-indicated condition, the cross-linking or cross-linkage of the molecules on the surfaces of the particles of the poly(metal salt of acrylic acid) is released or cut, whereby the water absorptive resin particles are given increased affinity for water, at their surfaces, whereby the rate of water absorption of the thus treated water absorptive resin is accordingly increased. However, the interior of the particles of the cross-linked poly(metal salt of acrylic acid) maintains the cross-linked molecular structure, whereby the water absorptive resin exhibits a high ratio of hygroscopic swelling due to the high water absorbing capability of the cross-linked poly(metal salt of acrylic acid).

To further clarify the present invention, there will be described some examples of the present invention, together with comparative examples.

EXAMPLES

Specimens of the water absorptive polymer in the form of cross-linked sodium polyacrylate were impregnated with different amounts (% by weight) of water as indicated in Table 1. The water-impregnated specimens were then placed in an autoclave for the time periods indicated in the same table. The temperature of the atmosphere within the autoclave was kept at 95° C. The autoclaved specimens were dried at 70° C. for 24 hours.

Thus, eight examples (Nos. 1-8) of the water absorptive resin according to the invention were prepared. These examples were submerged in an artificial saltwater, and the ratio of swelling of the resin due to absorption of the saltwater was measured 3 minutes and 24 hours after the submergence. The measurements, which are indicated in Table 1, were based on a difference in weight of the specimen resins before and after the submergence. It will be understood from Table 1 that the examples according to the invention exhibited considerably higher ratios of swelling 3 minutes after the submergence, than a comparative example which was not autoclaved. This means accordingly increased rates of water absorption of the examples according to the invention. It is also noted that the ratio of swelling 24 hours after the submergence of the examples according to the invention is substantially the same as that of the comparative example. This indicates that the autoclaving of the cross-linked sodium polyacrylate will not deteriorate the swelling property of the water absorptive resin.

The same water-impregnated specimens of the water absorptive polymer as used to produce the examples Nos. 1-8 in Table 1 were exposed to an ultraviolet radiation at 50° C. for time periods as indicated in Table 2. The specimens exposed to the ultraviolet radiation were dried at 70° C. for 24 hours. Thus, eight examples (Nos. 9-16) of the water absorptive resin according to the invention were prepared. These examples were submerged in an artificial saltwater, and the ratio of swelling of the resin due to absorption of the saltwater was measured 3 minutes and 24 hours after the submergence in the same manner as described above. The measurements were indicated in Table 2. It will be understood from Table 2 that the examples according to the invention exhibited considerably higher ratios of swelling 3 minutes after the submergence, than a comparative example which was not exposed to a ultraviolet radiation. This means accordingly increased rates of water absorption of the examples according to the invention. It is also noted that the ratio of swelling 24 hours after the submergence of the examples according to the invention is substantially the same as that of the comparative example. This indicates that the exposure of the cross-linked sodium polyacrylate will not deteriorate the swelling property of the water absorptive resin.

TABLE 1

| | EXAMPLES ACCORDING TO THE INVENTION | | | | | | | | COMPARATIVE EXAMPLE |
|---|---|---|---|---|---|---|---|---|---|
| | 1 | 2 | 3 | 4 | 5 | 6 | 7 | 8 | |
| Water Absorptive Resin | Cross-linked sodium acrylate[*1] | | | | | | | | |
| Impregnating water (wt. %) | 2 | 5 | 20 | 50 | 100 | 200 | 50 | 50 | None |
| Autoclaving temperature | 95° C. | | | | | | | | None |
| Autoclaving time (min.) | 30 | 30 | 30 | 30 | 30 | 30 | 10 | 20 | None |
| Ratio of 3 min. swelling | 2.7 | 2.9 | 3.1 | 3.2 | 4.0 | 5.0 | 2.6 | 3.0 | 1.5 |
| Ratio of 24 hr. swelling | 20 | 25 | 20 | 27 | 30 | 29 | 28 | 25 | 21 |

[*1]SUMIKA GEL N-100 available from Sumitomo Chemical Co., Ltd., Japan

TABLE 2

| | EXAMPLES ACCORDING TO THE INVENTION | | | | | | | | COMPARATIVE EXAMPLE |
|---|---|---|---|---|---|---|---|---|---|
| | 9 | 10 | 11 | 12 | 13 | 14 | 15 | 16 | |
| Water Absorptive Resin | Cross-linked sodium acrylate[*1] | | | | | | | | |
| Impregnating water (wt. %) | 2 | 5 | 20 | 50 | 100 | 200 | 50 | 50 | None |
| Ultraviolet exposure[*2] Temperature | 50° C. | | | | | | | | None |
| Time (min.) | 1 | 1 | 1 | 1 | 1 | 1 | 0.5 | 5 | None |
| Ratio of 3 min. swelling | 2.0 | 5.2 | 8.5 | 10.0 | 9.0 | 8.0 | 5.1 | 7.2 | 1.5 |
| Ratio of 24 hr. swelling | 20 | 21 | 20 | 21 | 18 | 11 | 21 | 15 | 21 |

[*1]SUMIKA GEL N-100 available from Sumitomo Chemical Co., Ltd., Japan
[*2]FADE-METER available from Kabushiki Kaisya Toyo Seiki Seisakusho, Japan According to one embodiment of the present invention described above by reference to Table 1, the water-impregnated water absorptive polymer whose major component consists of a cross-linked poly(metal salt of acrylic acid) is autoclaved or otherwise exposed to a high-temperature highly-humid atmosphere. According to an alternative embodiment of the present invention described above by reference to Table 2, the water-impregnated water absorptive polymer is exposed to an ultraviolet radiation. The exposure to the high-temperature highly-humid atmosphere or ultraviolet radiation results in a considerably increased rate of water absorption of the water absorptive resin, without deteriorating the water absorbing capability, thereby making it possible to use the water absorptive resin of the present invention in an environment which requires rapid water absorption, for example, as a water cut-off material for a submarine optical fiber cable.

While the present invention has been described above, with the presently preferred examples indicated in Tables 1 and 2, it is to be understood that the invention is not limited to the details of the illustrated examples, but may be embodied with various changes, modifications and improvements, which may occur to those skilled in the art, without departing from the spirit and scope of the invention defined in the following claims.

What is claimed is:

1. A process of producing a water absorptive resin having an improved rate of water absorption or hygroscopic swelling, comprising the steps of:
   (a) preparing particles of a water absorptive polymer comprising a cross-linked poly(metal salt of acrylic acid) as a major component;
   (b) impregnating the prepared water absorptive polymer particles of step (a) with at least 5% by weight of water;
   (c) exposing the water-impregnated water absorptive polymer particles of step (b) either to (i) an autoclaving treatment or (ii) an ultraviolet radiation, under conditions sufficient to partially release or cut the cross-linkage at the surfaces of the particles to form at or near the surfaces of the particles water-soluble poly(metal salt of acrylic acid) and thus form a water absorptive polymer with a higher rate of water absorption or hygroscopic swelling than a polymer without treatment; and
   (d) drying under heat the water-impregnated water absorptive polymer particles exposed to said autoclaving treatment or said ultraviolet radiation.

2. A process according to claim 1, wherein said salt of acrylic acid is sodium.

3. A process according to claim 2, wherein said step of preparing a water absorptive polymer comprises copolymerizing metal salt of acrylic acid, and a cross-linking agent selected from the group consisting of: methylenebis (acrylamide); trimethylolpropane triacrylate; ethylene glycol diacrylate; polyethylene glycol diacrylate; neopentyl glycol diacrylate; and tetramethylolmethane tetraacrylate.

4. A process according to claim 1, wherein said prepared water absorptive polymer particles of step (a) are impregnated with 5-100% of weight of water.

5. A process according to claim 1, wherein said prepared water absorptive polymer particles are impregnated with 5-10% by weight of water.

6. A process according to claim 1, wherein said step of exposing the water-impregnated water absorptive polymer comprises autoclaving said water-impregnated water absorptive polymer.

7. A process according to claim 6, wherein said autoclaving is effected for a period of about 5-30 minutes at a temperature of 80°-120° C.

8. A process according to claim 1, wherein said step of exposing the water-impregnated water absorptive polymer comprises exposing said water-impregnated water absorptive polymer to a saturated steam.

9. A process according to claim 1, wherein said step of exposing the water-impregnated water absorptive polymer comprises exposing said water-impregnated water absorptive polymer to said ultraviolet radiation.

10. A process according to claim 9, wherein said exposing said water-impregnated water absorptive polymer to said ultraviolet radiation is effected for a period of 1-5 minutes.

* * * * *

UNITED STATES PATENT AND TRADEMARK OFFICE
CERTIFICATE OF CORRECTION

PATENT NO. : 5,244,934

DATED : September 14, 1993

INVENTOR(S) : Umeda et al.

It is certified that error appears in the above-identified patent and that said Letters Patent is hereby corrected as shown below:

On the title page, Assignee: [73] correct the spelling of "TAKAI" to --TOKAI--.

Signed and Sealed this

Twenty-ninth Day of March, 1994

Attest:

BRUCE LEHMAN

*Attesting Officer*       *Commissioner of Patents and Trademarks*